(12) United States Patent
Khovaylo

(10) Patent No.: US 7,104,450 B2
(45) Date of Patent: Sep. 12, 2006

(54) OPTICAL SCANNER ASSEMBLY AND RELATED METHODOLOGY

(75) Inventor: Modest Khovaylo, Fort Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 25 days.

(21) Appl. No.: 10/820,086

(22) Filed: Apr. 6, 2004

(65) Prior Publication Data

US 2005/0002075 A1 Jan. 6, 2005

Related U.S. Application Data

(60) Provisional application No. 60/461,261, filed on Apr. 7, 2003, provisional application No. 60/461,273, filed on Apr. 7, 2003.

(51) Int. Cl.
*G06K 7/10* (2006.01)
(52) U.S. Cl. .................................. 235/454; 235/472.01
(58) Field of Classification Search ................................
235/462.01–462.47, 472.01, 472.02, 472.03,
235/454, 455, 494, 470
See application file for complete search history.

(56) References Cited

U.S. PATENT DOCUMENTS

| | | | |
|---|---|---|---|
| 5,754,713 A | 5/1998 | Deguchi et al. | |
| 5,981,943 A | 11/1999 | Berg et al. | |
| 6,040,572 A | 3/2000 | Khovaylo et al. | |
| 6,168,079 B1 * | 1/2001 | Becker et al. | 235/383 |
| 6,233,064 B1 | 5/2001 | Griffin | |
| 6,244,510 B1 * | 6/2001 | Ring et al. | 235/462.43 |
| 6,357,704 B1 * | 3/2002 | Katoh et al. | 248/133 |
| 6,460,768 B1 * | 10/2002 | Ring et al. | 235/462.43 |
| 6,517,001 B1 * | 2/2003 | Knowles et al. | 235/462.01 |
| 6,616,046 B1 * | 9/2003 | Barkan et al. | 235/462.29 |
| 6,764,012 B1 * | 7/2004 | Connolly et al. | 235/462.45 |
| 6,811,086 B1 * | 11/2004 | Kumagai et al. | 235/462.14 |
| 6,814,293 B1 * | 11/2004 | Curry et al. | 235/472.01 |
| 2004/0149829 A1 * | 8/2004 | Boucher et al. | 235/462.43 |

* cited by examiner

*Primary Examiner*—Thien M. Le

(57) ABSTRACT

An optical scanner may be used either with or without a support stand. When operated without the support stand, the scanner may be used to acquire an image of an object in virtually any location and/or orientation, e.g., an image of a picture hanging on a wall. When used in conjunction with the support stand, the scanner may attach to the support stand such that it is able to pivot with respect to the support stand. An object to be scanned (e.g., a document) may then be placed on a support surface of the support stand and the scanner pivoted to a closed position to allow scanning of the object. In this manner, the scanner may also be used in a manner similar to a conventional flatbed scanner.

24 Claims, 15 Drawing Sheets

OPTICAL SCANNER ASSEMBLY AND RELATED METHODOLOGY

This application claims the benefit of U.S. Provisional Application No. 60/461,261, filed Apr. 7, 2003, for OPTICAL SCANNER ASSEMBLY of Modest Khovaylo which is hereby incorporated by reference for all that is disclosed therein.

U.S. Provisional Application No. 60/461,273, filed Apr. 7, 2003, for OPTICAL SCANNER ASSEMBLY of Modest Khovaylo and U.S. patent application Ser. No. 10/819,805 filed Apr. 6, 2004, for OPTICAL SCANNER ASSEMBLY of Modest Khovaylo et al. are hereby incorporated by reference for all that is disclosed therein.

BACKGROUND

Scanner devices, such as flatbed scanners, are well-known in the art and produce machine-readable image data signals that are representative of a scanned object, such as a photograph or a page of printed text. In a typical scanner application, the image data signals produced by a scanner may be used by a personal computer to reproduce an image of the scanned object on a suitable display device, such as a CRT or a printer. A typical flatbed scanner may include illumination and optical systems to accomplish scanning of the object. The illumination system illuminates a portion of the object (commonly referred to as a "scan region"), whereas the optical system collects light reflected by the illuminated scan and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object.

SUMMARY

An optical scanner may be used either with or without a support stand. When operated without the support stand, the scanner may be used to acquire an image of an object in virtually any location and/or orientation, e.g., an image of a picture hanging on a wall.

When used in conjunction with the support stand, the scanner may attach to the support stand such that it is able to pivot with respect to the support stand. An object to be scanned (e.g., a document) may then be placed on a support surface of the support stand and the scanner pivoted to a closed position to allow scanning of the object. In this manner, the scanner may also be used in a manner similar to a conventional flatbed scanner.

DETAILED DESCRIPTION

Figure 1:
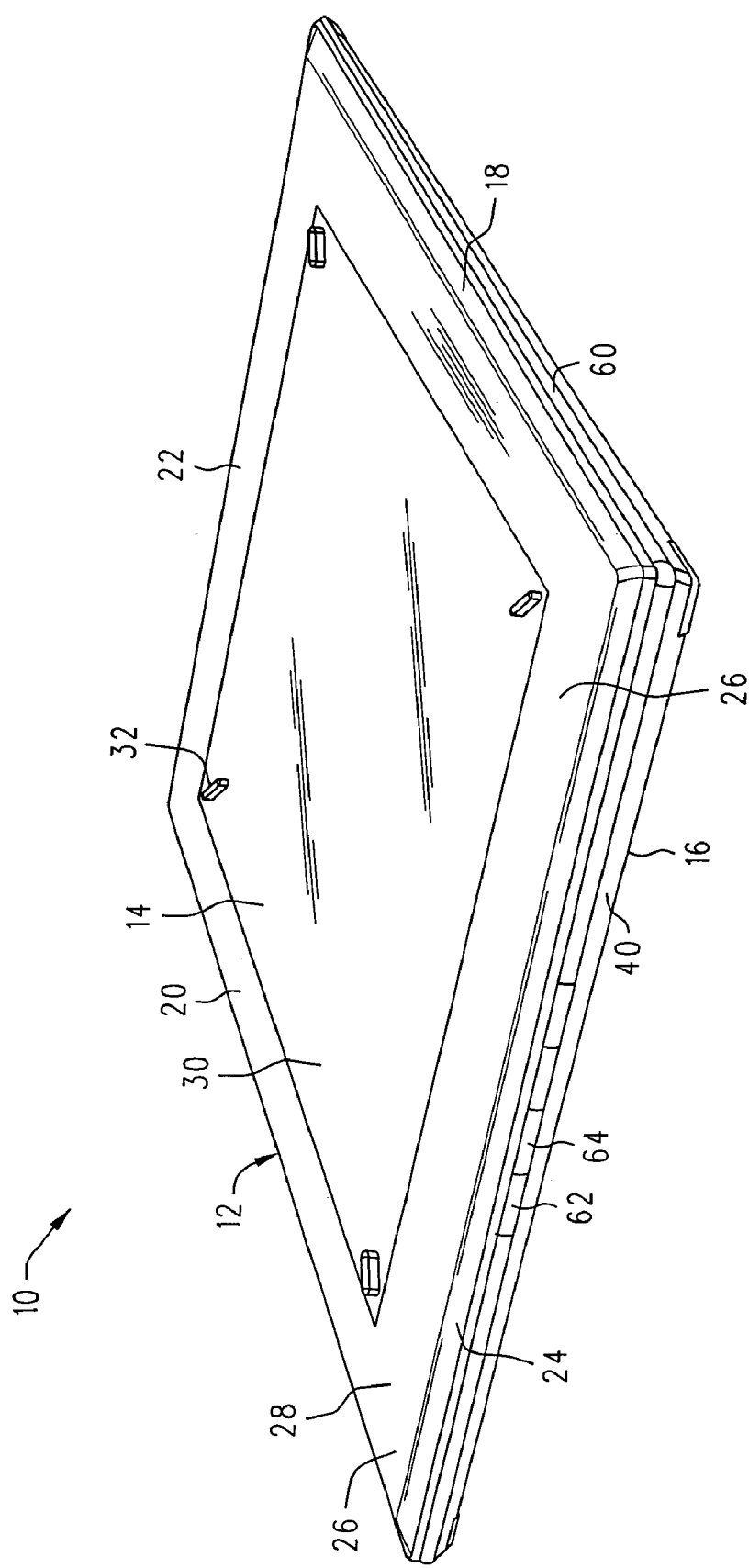
FIG. 1 is a front perspective view of an optical scanner.

FIG. 1 illustrates an optical scanner 10 having a thin rectangular housing 12. The housing has a front face portion 14, back face portion 16 (FIG. 2); a top portion 18; a bottom portion 20; a left side portion 22; and a right side portion 24. It is to be understood that the designations top, bottom, front, rear, left side and right side are arbitrary and are merely for the purpose of establishing a frame of reference for description of the scanner.

The scanner housing 12 in one embodiment comprises a front housing member 26 attached to a rear housing member 40. The front housing member 26 may comprise a opaque peripheral structure 28 having a transparent plate 30 mounted thereon with the upper surface of the opaque peripheral structure 28 and transparent plate positioned in substantially coplanar relationship. Resilient guard members 32 may be mounted at corner portions of the transparent plate 30 the resilient guard members 32 act to prevent the surface of the transparent plate 30 from coming into contact with an adjacent flat surface.

Figure 2:
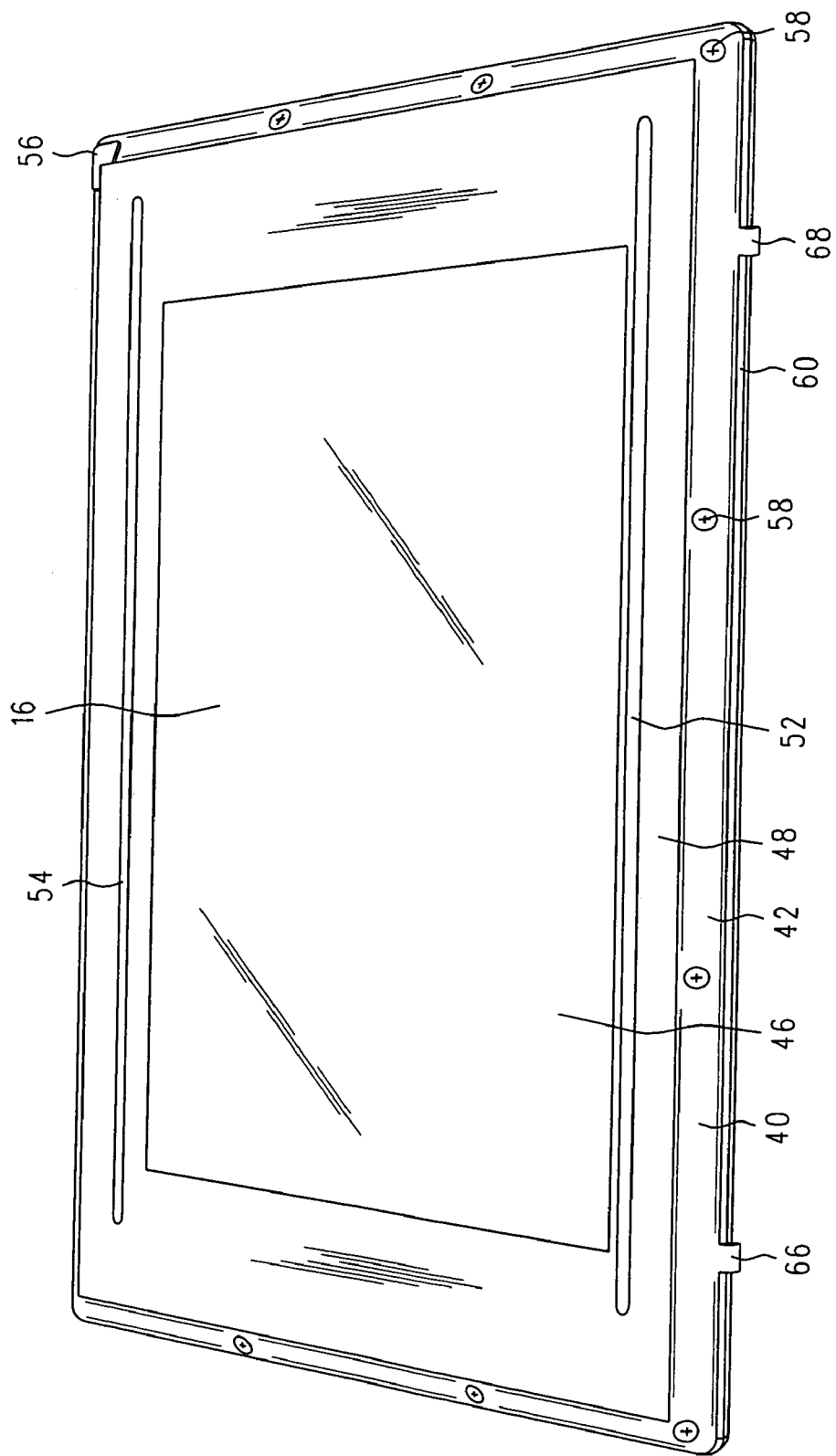
FIG. 2 is a back perspective view of the optical scanner of FIG. 1.

Rear housing member 40, FIG. 2, comprises a peripheral opaque structure 42 within which is mounted a plate member 44 in generally coplanar relationship with the adjacent surface of the peripheral structure 42. The plate member 44 comprises a rectangular transparent portion 46 aligned with the transparent plate 30 on the front housing member 26. Transparent portion 46 comprises a scanning face which is positioned in engagement or near engagement with an object, such as a document, which is to be scanned. Plate member 44 also comprises a black peripheral portion 48 which encompasses the transparent portion 46. Transparent longitudinal strips 52 54 are also defined within the opaque portion 48. The longitudinal strips extend in the direction of scanner head displacement as described in further detail below. Resilient corner guard members 56 (only one shown) extend a short distance outwardly from peripheral opaque structure 42 to help prevent abrasion of the rectangular plate member 46 when the scanner rear face is positioned against a flat object, for example when it is laid on a desk top. The front and rear housing members 26, 40 may be connected by screws, bolts, rivets, adhesive or other attachment means. In one embodiment the opposed interior peripheral edges of the front and rear housing members 26, 40 are separated by spacers e.g., tubular sleeves held in position by screws 58 extending there through. In one embodiment the gap 59, FIG. 4, formed by the spacers may be about 5 mm and may be sealed with a resilient grommet 60. Control surfaces such as push button 62, 64, etc. may be positioned in the gap 59 as illustrated in FIG. 1. Support stand registration tabs 66 may be mounted in the gap 59 and extend outwardly a short distance e.g., 3 mm from the bottom portion of the scanner housing 12.

Figure 3:
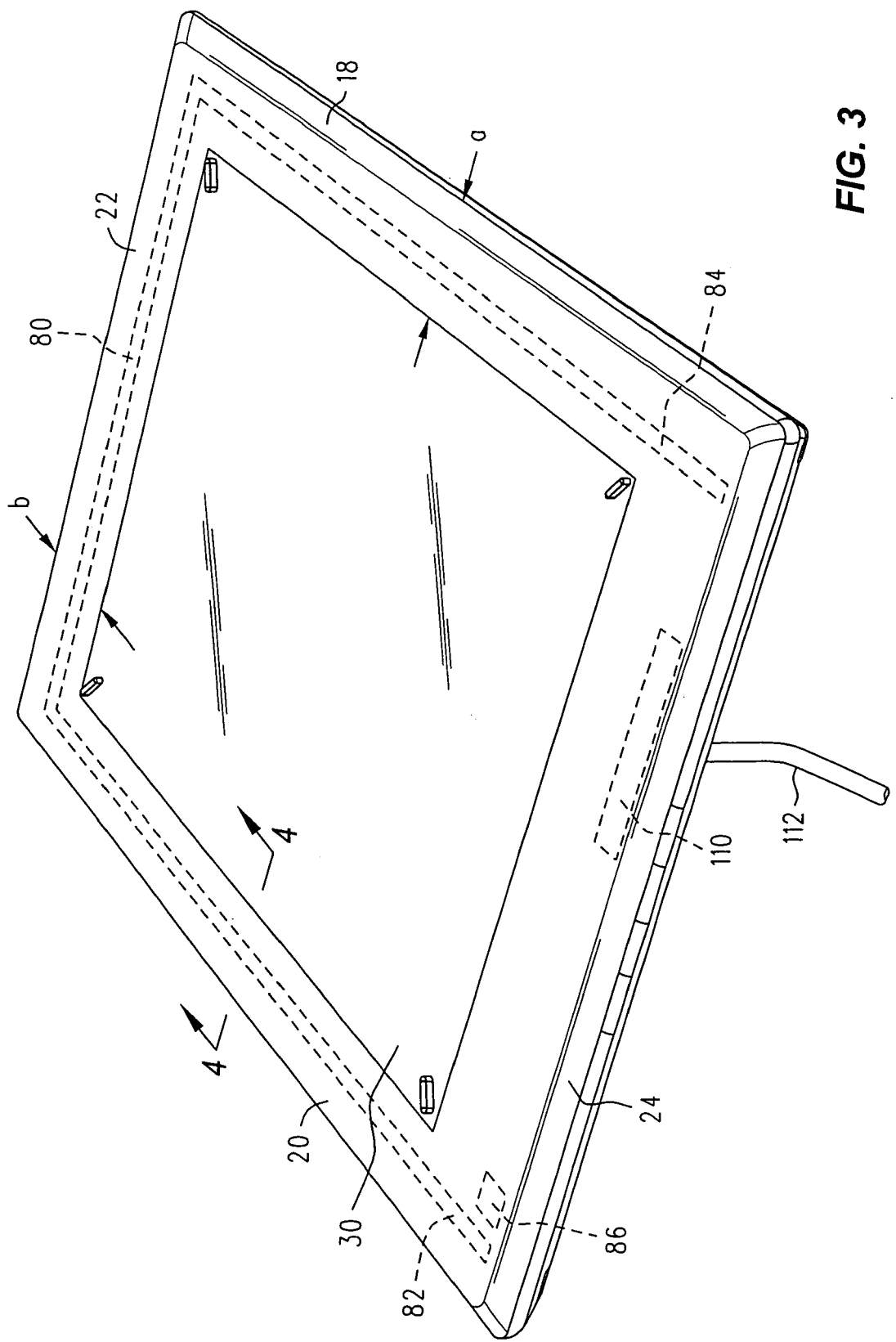
FIG. 3 is a front perspective view of the optical scanner of FIG. 1 showing certain internal structure thereof in hidden lines.
Figure 4:
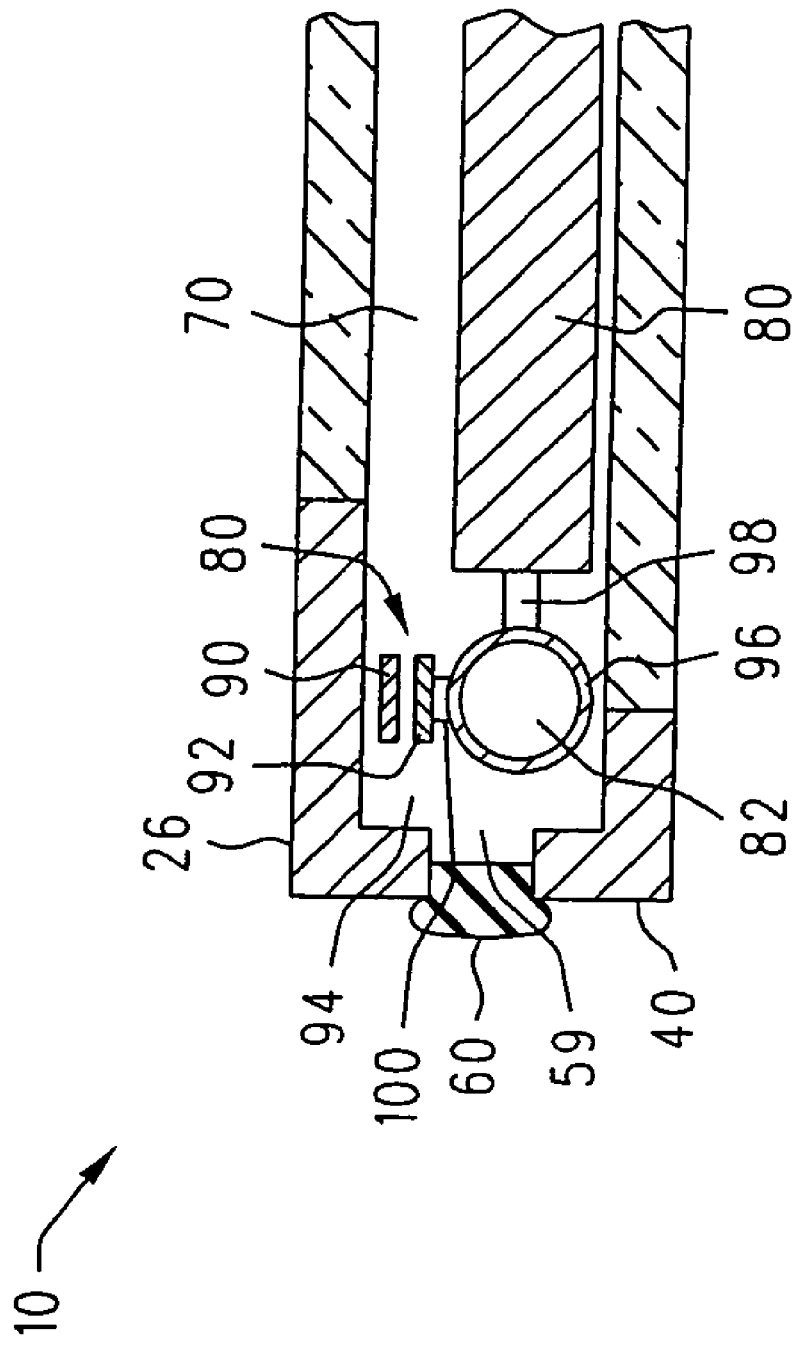
FIG. 4 is a schematic cross sectional view of the optical scanner of FIG. 1.

As illustrated by FIGS. 3 and 4, a displaceable scanning head 80 is position within the enclosure 70 defined by the housing front and rear members 26, 40. Scanning head 80 may comprise a contact image sensor assembly or other type sensor assembly capable of being provided in a small thickness configuration. The displaceable scanning head also comprises an illumination source such as LED's, one or more flourescent bulbs, or other illumination means. Scanning head 80 extends from the top portion 18 to the bottom portion 20 of the scanner terminating near the transparent strips 52,54. The scanning head 80 is displaceably supported on support rails 82,84 which extend in the direction of scanning movement. A sleeve 96 (only one shown) is slidingly mounted on each rail 82 84 and is attached by a connection member 98 to scanning head 80. One or more electric drive motors 86 are also mounted within the housing enclosure 70 at a lateral end of the enclosure. In one embodiment there is only one drive motor 86 having a single endless belt 88 connected. The belt extends in alignment with one of the drive rails e.g., 82. The drive belt 88 may be connected to a drive pulley (not shown) on the motor 86 and may be connected to an idler pulley near the end of support shaft 82 opposite to the end where the motor 86 is located. The belt 88 comprises a first portion 90 and a second portion 92. In one embodiment the first and second portions of the belt 90,92 and the shaft 82 are positioned in front to rear alignment in the space 94 between opposite opaque portions of the front and rear housing member 26, 40. The sleeve 96 is connected to the adjacent belt portion 92 by any appropriate connector such as a clip, strap, rivet, adhesive or other connector. Rotational displacement of the drive motor 86 causes linear displacement of the portions 90, 92 of the endless belt which in turn causes linear displacement of the sleeve 96 and attached scanning head 80.

Prior to a scanning operation the displaceable scanning head 80 is parked at a location at one lateral end e.g., end portion 22 of the housing below the opaque portion thereof. During a scanning operation the displaceable scanning head 80 moves in a path defined by support rails 82, 84, passing between the front transparent plate 30 and the rear transparent plate portion 46. At the end of the scanning operation the scanning head returns to its parked position between opaque portions of the front and rear housing members 26, 40 at end 22. In a alternative embodiment rather than having a single motor 86, two drive motors could be provided, one associated with each guide rail 82, 84. In this alternative embodiment the motors may be locked in a phase locked loop to provide synchronous operation. In another embodiment a single drive motor 82 rotates a drive shaft (not shown) having a drive pulley mounted in association with each of the support rails 82 84 and a separate endless build 88 is operably connected to these drive pulleys and also to the separate support sleeves to which the scanning head is connected.

In further alternative embodiments the endless belt is positioned between the scanning head 80 and shaft 82 and only one guide shaft 82 is used. The side of the scan head located opposite the shaft 82 is supported by spring wheels (not shown) which engage the interior glass panel surfaces of both the front and rear housing members 26, 40.

Various electronic components and interfaces 110 may be mounted at one end portion, e.g., 24 of the housing and connected to the scanning head as by electrical cables (not shown). An exterior cable 112 connected to the electronic components 110 may in turn be connected to a scanner input receiving device such as a computer or printer (not shown). The cable 112 may be a power cable such as a Firewire connector, a universal serial bus connector or any other appropriate type of electrical connector in current use or developed in the future. In an alternative embodiment a transmitter is provided either in electronic components 110 or directly on the scanning head 80 which transmits data signals wirelessly to a receiver in a computer, scanner, etc. Power to the unit may be provided from an external power source as through cable 112 or other power cable or alternatively may be provided by batteries or other onboard power source.

Figure 5:
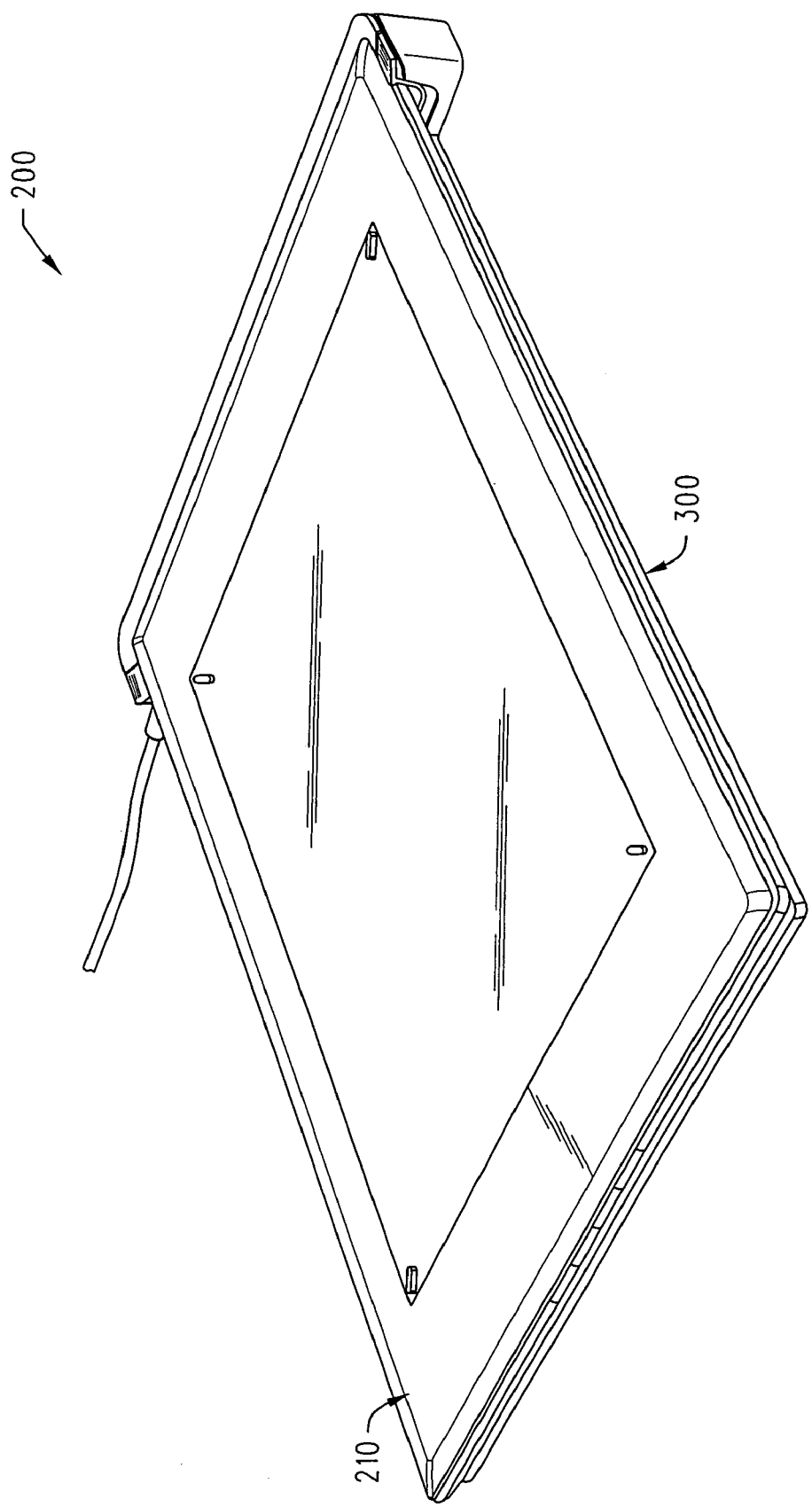
FIG. 5 is a top perspective view of an exemplary scanning assembly in a closed condition.
Figure 6:
FIG. 6 is a top perspective view of the exemplary scanning assembly of FIG. 5 in an open condition.

FIGS. 5 and 6 generally illustrate an optical scanning assembly 200 that may include an optical scanner 210 and a base assembly 300. Except as noted below, optical scanner 210 may, for example, be substantially identical to the optical scanner 10 previously described herein. Optical scanner 210 may also, for example, be substantially identical to that disclosed in U.S. Provisional Patent Application Ser. No. 60/461273, of Modest Khovaylo for OPTICAL SCANNER ASSEMBLY, filed on Apr. 7, 2003, which is hereby specifically incorporated by reference for all that is disclosed therein.

As will be described in further detail herein, optical scanner 210 may be removably attached to the base assembly 300 in order to allow the optical scanner 210 to optionally function in a manner similar to a conventional flatbed scanner when desired. FIG. 5 illustrates the scanning assembly 200 in a closed condition; whereas, in FIG. 6, the scanning assembly is shown in an open condition in which an object 202 to be scanned may be inserted in a conventional manner.

Figure 7:
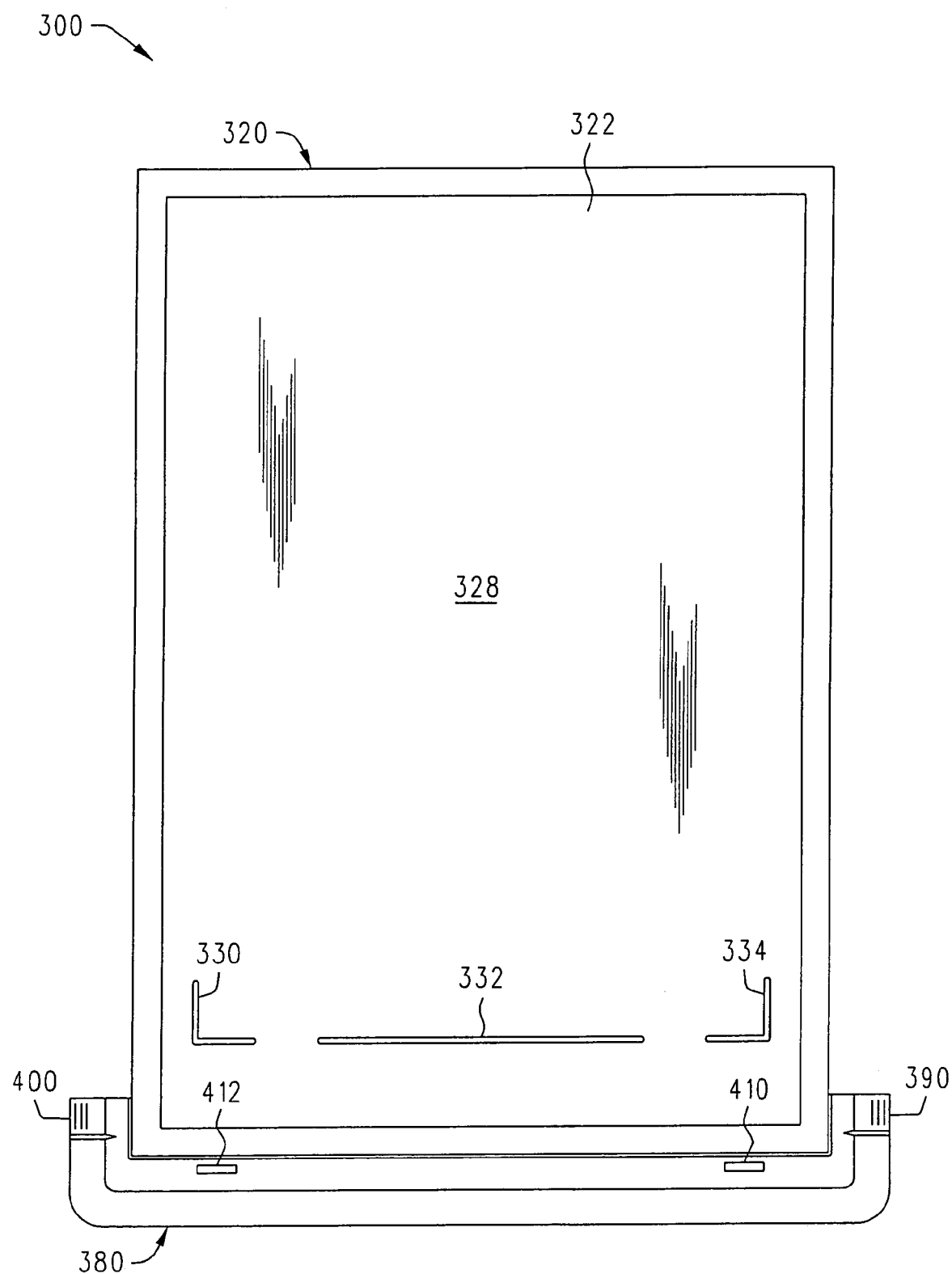
FIG. 7 is a top plan view of an exemplary base assembly of the exemplary optical scanning assembly of FIGS. 5 and 6.

FIGS. 7–10 illustrate the base assembly 300 with the optical scanner 210 removed for illustrative clarity purposes. Referring now to FIG. 7, base assembly 300 may include a support member 320 and a connection member 380. Support member 320 may include an upper surface 322 and an oppositely disposed lower surface 324, FIG. 9. A plurality of side surfaces 326, FIG. 8, may generally extend between the upper surface 322 and the lower surface 324. Referring again to FIG. 7, a pad 328 may be attached, e.g., via an adhesive, to the upper surface 322, as shown. Pad 328 may have a white or other light color finish in order to provide a suitable background for scanning operations. Pad 328 may also have a foam or other resilient backing to provide cushioning during scanning operations.

A plurality of guide members 330, 332, 334 may extend upwardly from the pad 328 as shown in FIG. 7. These guide members may be sized and located such that they may serve to locate an object to be scanned, e.g., a standard 8.5 by 11 inch document. Guide members 330, 332, 334 may be spring-loaded so that when pressure is applied thereto, the members will recess from their extended condition (as shown in FIG. 8) to a position in which they are at least partially recessed within the support member 320.

Figure 9:
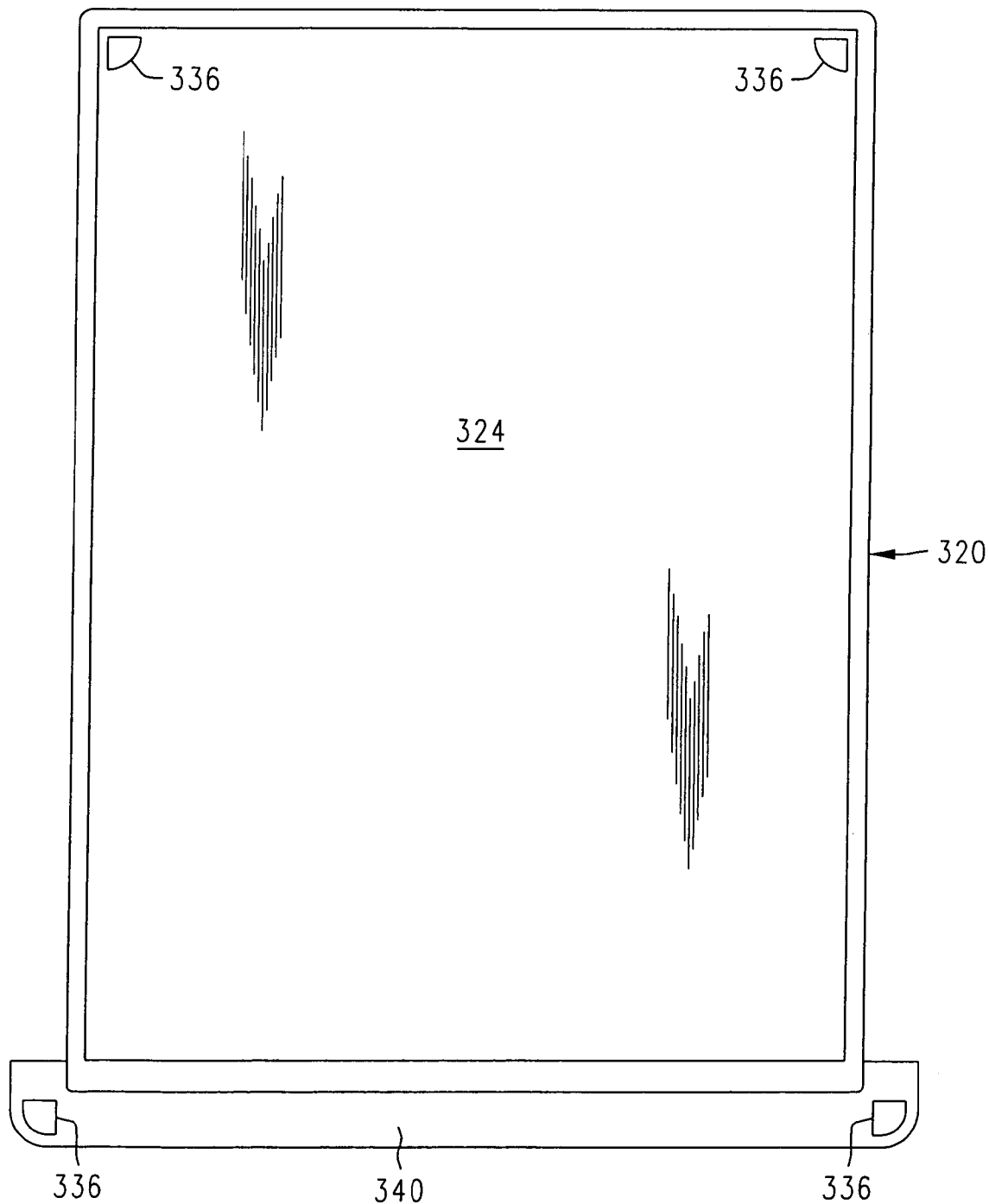
FIG. 9 is a bottom plan view of the exemplary base assembly of FIG. 7.
Figure 10:
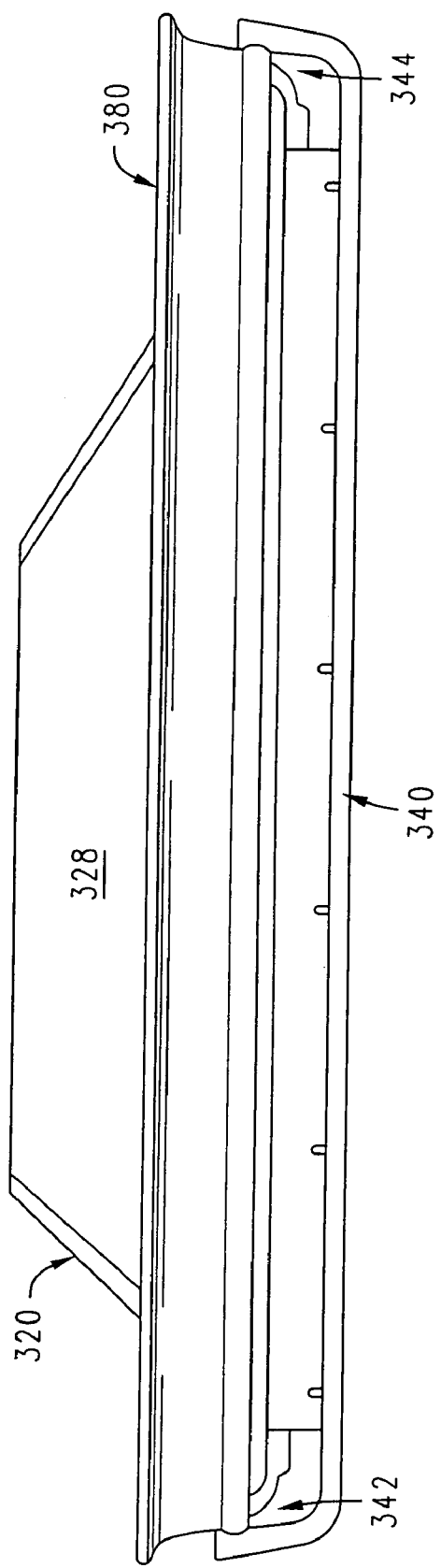
FIG. 10 is side elevation view of the exemplary base assembly of FIG. 7.

With reference to FIGS. 9 and 10, the support member 320 may include an attachment portion 340 located at one end thereof. The attachment portion 340 may, for example, be integrally formed, e.g., from a plastic material, with the remainder of the support member 320. A plurality of foot members 336 may be located on the support member lower surface 324 as shown. Foot members 336 may, for example, be formed from a rubber material that is adhered to the lower surface 324 and may be provided to increase the friction between the scanning assembly 200 and a surface upon which it is supported during use, e.g., the surface of a table or desk. In this manner, the foot members 336 tend to reduce any tendency for the scanning assembly 200 to shift relative to the supporting surface. Foot members 336 may also tend to protect the supporting surface from being scratched or otherwise marred by contact with the scanning assembly.

Figure 11:
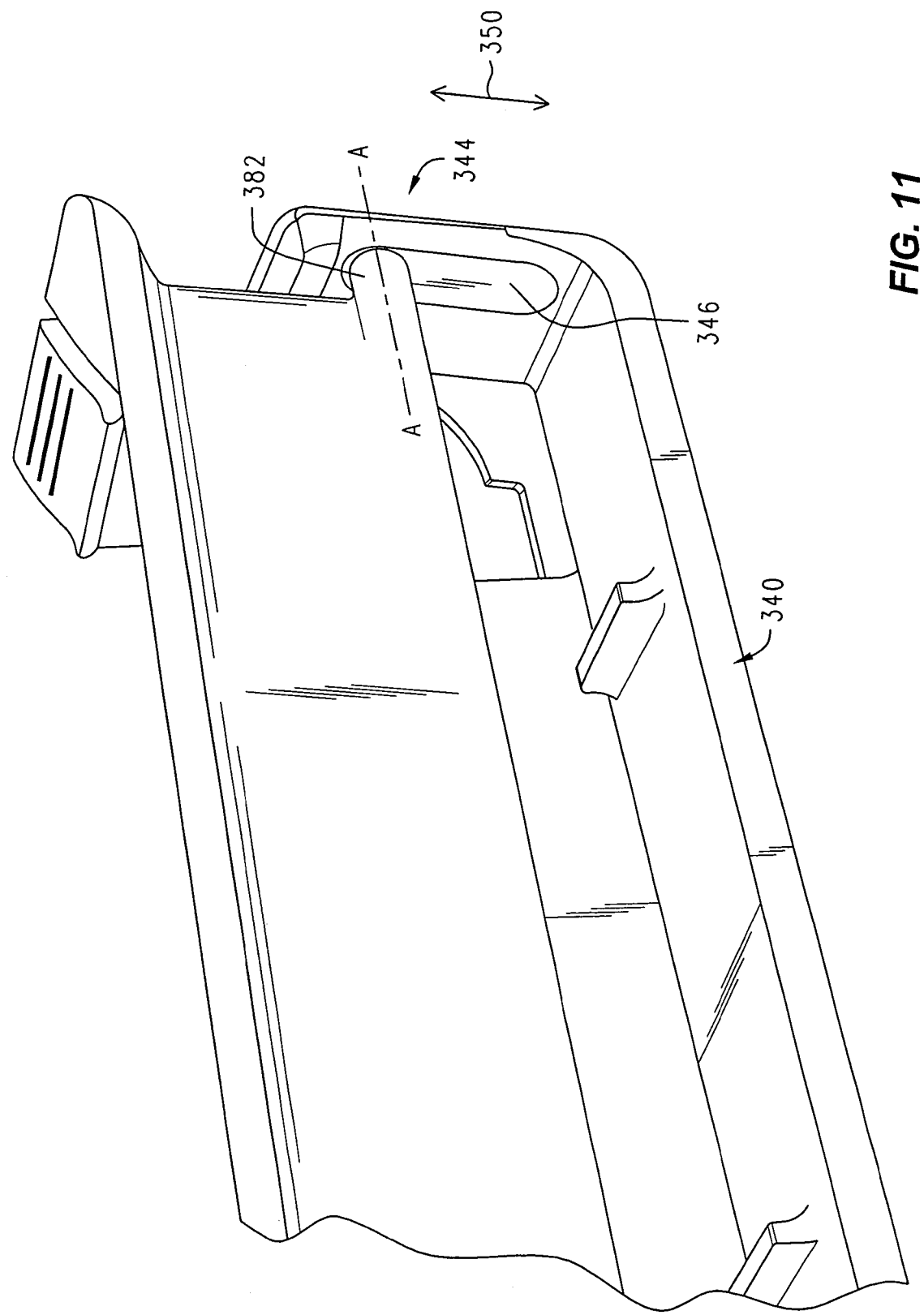
FIG. 11 is a detail perspective view of the exemplary base assembly of FIG. 7 showing the connection between an exemplary connection member and an exemplary attachment portion thereof.

With reference to FIG. 10, it can be seen that the connection member 380 may be hingedly attached to the support member attachment portion 340 via two hinged connections 342, 344. FIG. 11 shows, in further detail, the hinged connection 344, it being understood that the hinged connection 342 may be configured in substantially the same manner. With reference now to FIG. 11, the attachment portion 340 may be provided with a slot 346 that receives a pin 382 formed on the connection member 380. As can be appreciated, this connection between the connection member 380 and the attachment portion 340 allows the connection member 380 to translate in the directions indicated by the arrow 350 as well as rotate about the axis A–A relative to the attachment portion 340. In other words, the rotation axis A–A is able to translate in the directions indicated by the arrow 344.

Figure 8:
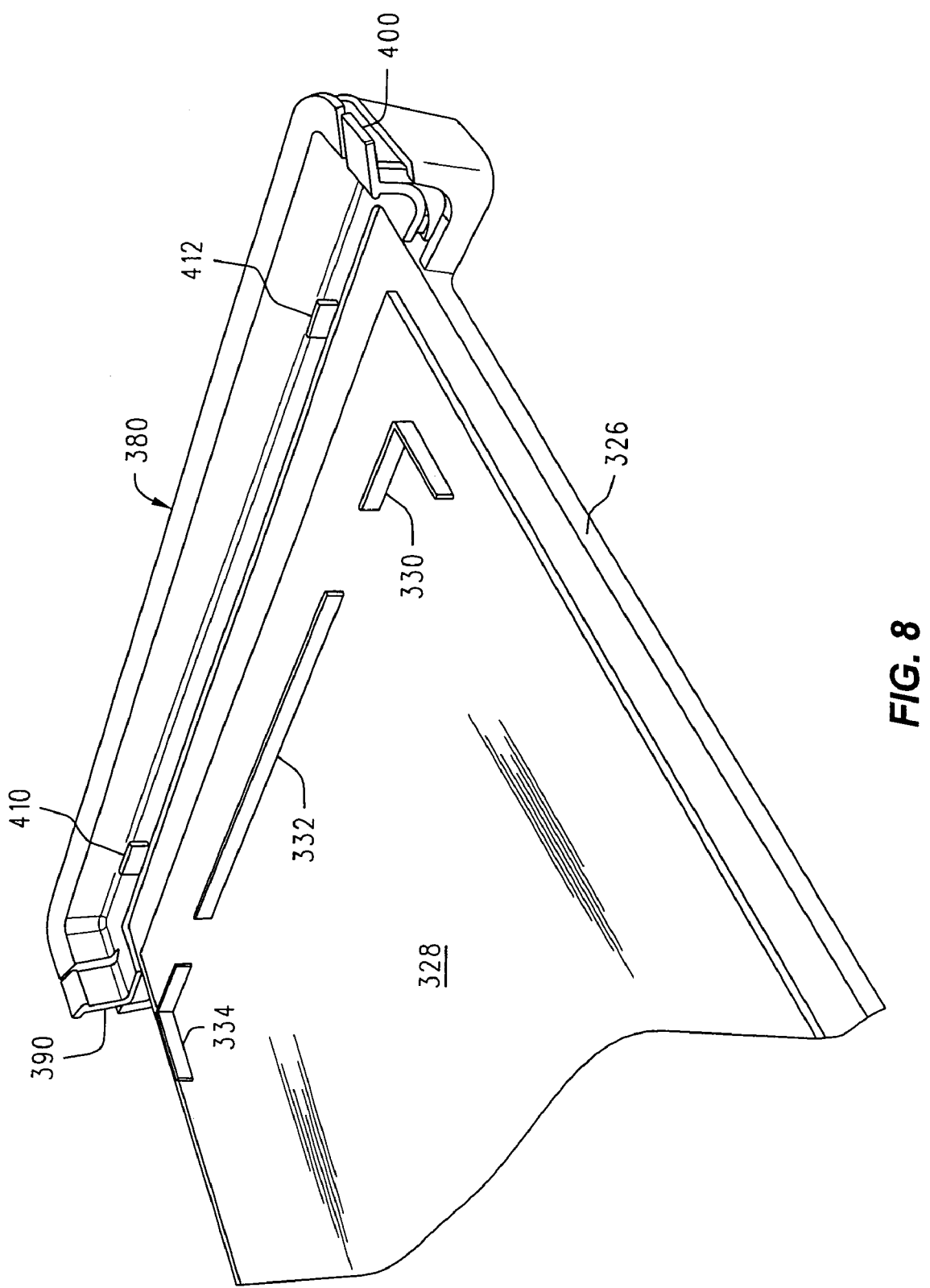
FIG. 8 is top perspective view of the exemplary base assembly of FIG. 7.
Figure 12:
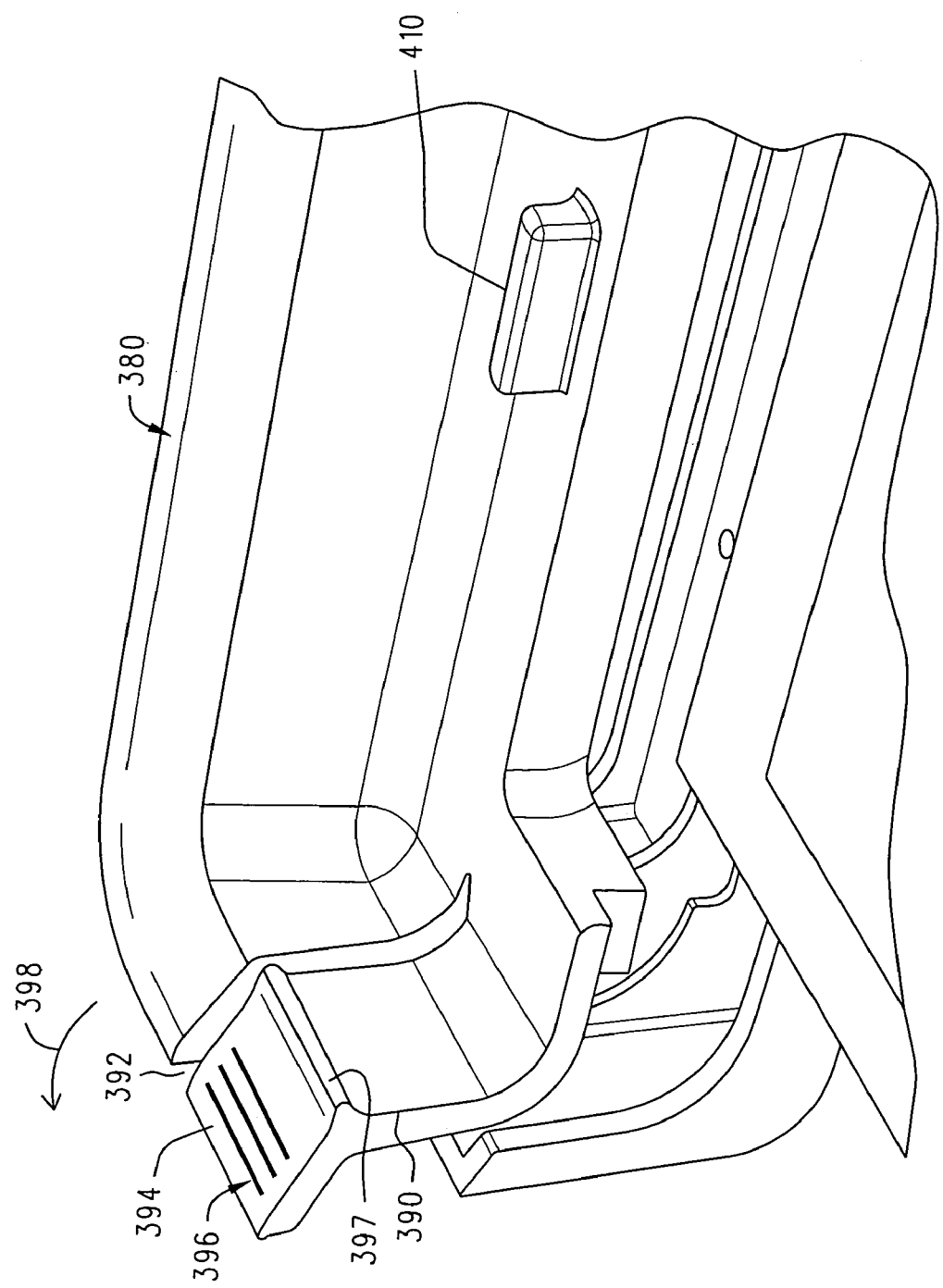
FIG. 12 is a detail view similar to FIG. 11 but viewed from a different perspective.

Referring to FIGS. 7 and 8, connection member 380 may include a pair of oppositely disposed latch members 390, 400 and a pair of projections 410, 412, as shown. FIG. 12 shows, in further detail, the latch member 390 and projection 410, it being understood that the latch member 400 and projection 412 may be configured in substantially the same manner. With reference now to FIG. 12, the latch member 390 may be integrally formed (e.g., from a plastic material) with the remainder of the connection member 380. Latch member 390 may include a finger or thumb engageable portion 394. Portion 394 may include a plurality of ridges 396 formed thereon to facilitate engagement by a finger or thumb. A lip 397 may be formed generally opposite the portion 394 as shown. A slot 392 may be formed as shown partially separating the latch member 390 from the remainder of the connection member 380. In this manner, pressure may be applied by a finger or thumb to the portion 394 thus causing the latch member 394 to move in the direction generally indicated by the arrow 398. Upon release of this pressure, the latch member 394 will resile in a direction opposite the arrow 398 to the position shown in FIG. 12.

Figure 13:
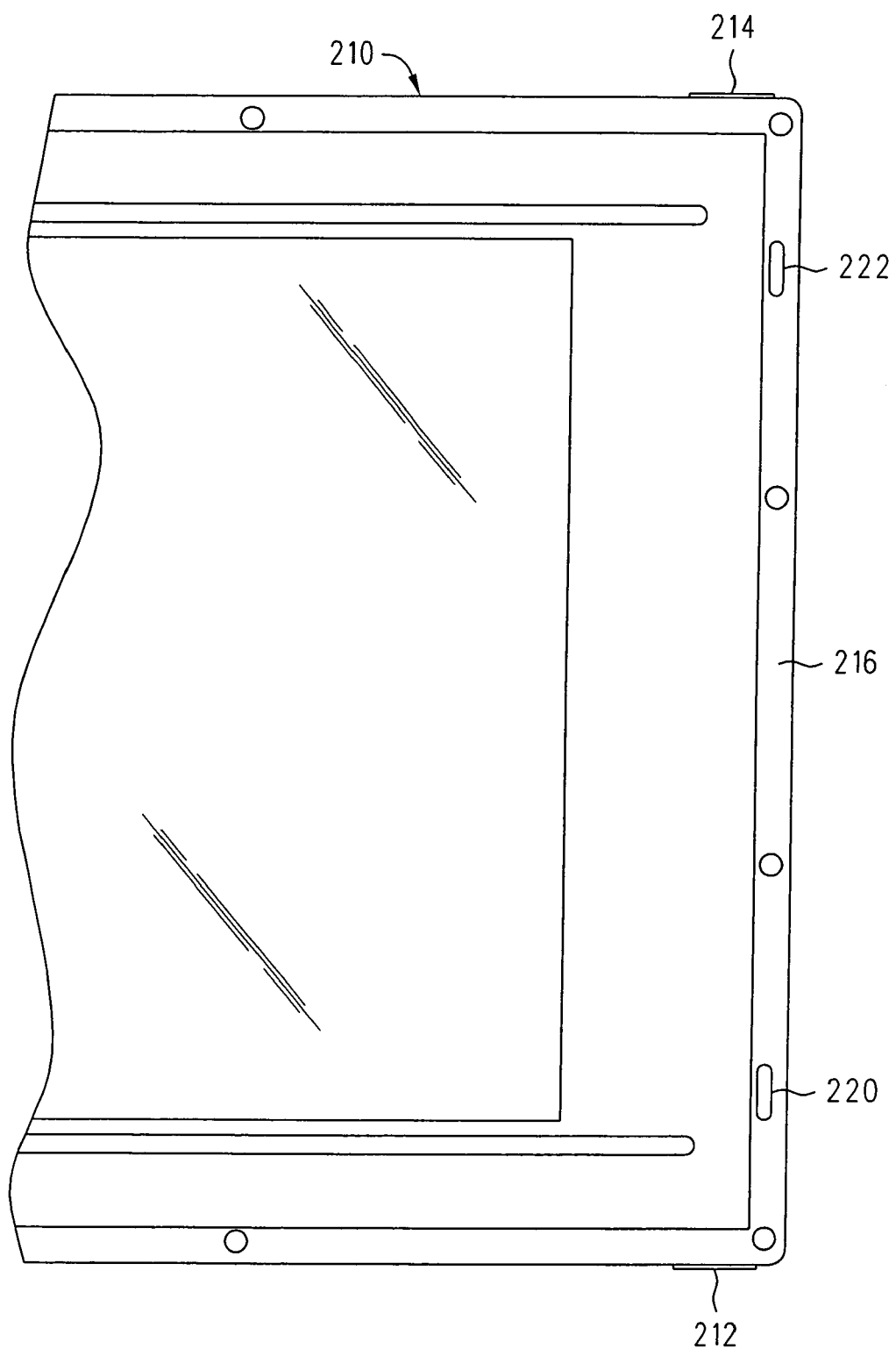
FIG. 13 is bottom plan view of an exemplary optical scanner of the exemplary optical scanning assembly of FIGS. 5 and 6.
Figure 14:
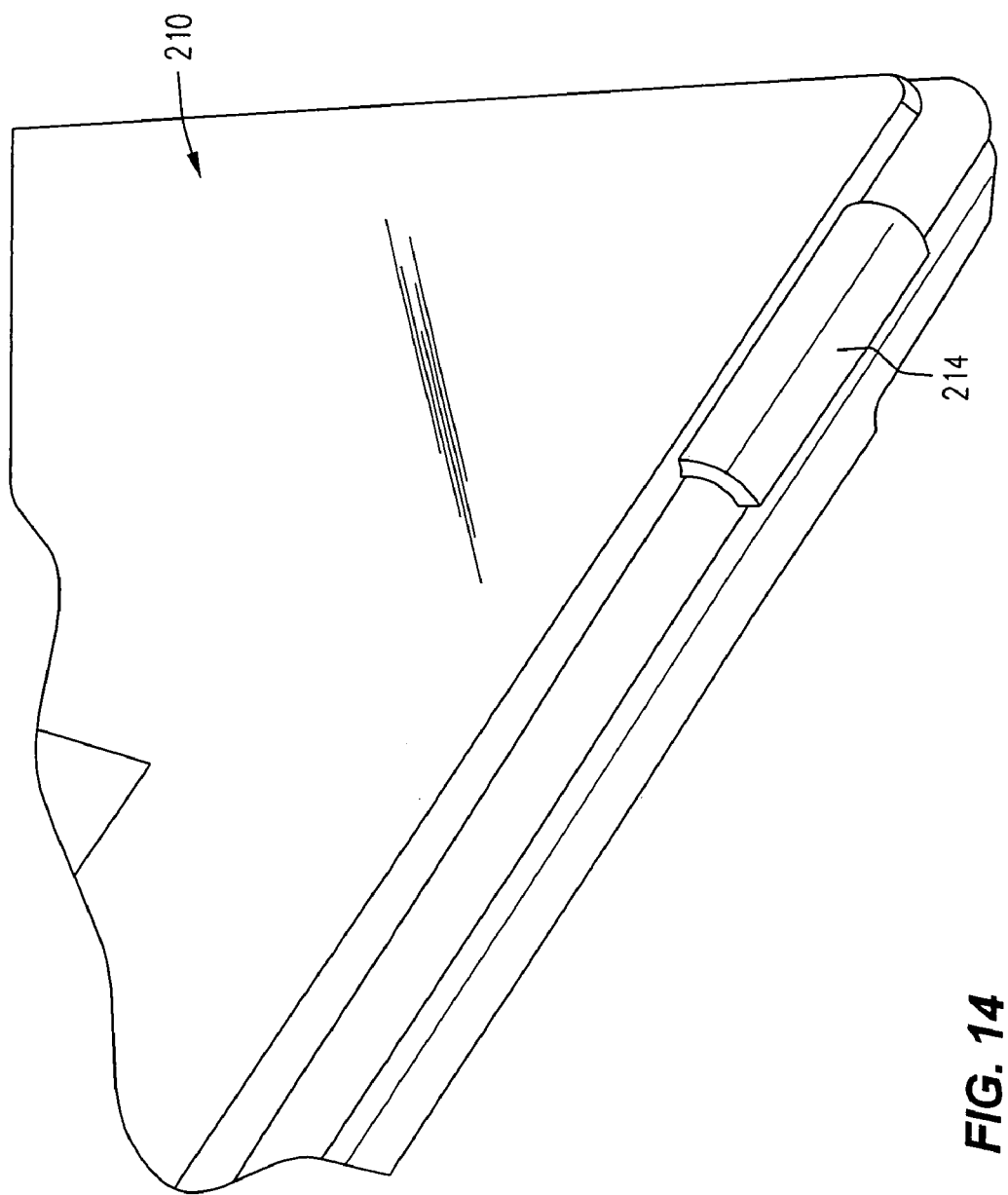
FIG. 14 is detail perspective view of a portion of the exemplary optical scanner of FIG. 13.

As noted previously, the optical scanner 210 may be constructed in a substantially identical manner to the optical scanner 10 previously described herein. Optical scanner 210 may, however, include various additional features to facilitate attachment to the base assembly 300 as will now be described in detail. Referring to FIG. 13, the optical scanner 210 may include an oppositely disposed pair of catch members 212, 214, as shown. The catch members 212, 214 may, for example, be formed from a relatively hard plastic material and may be attached to the optical scanner 210 in any conventional manner. FIG. 14 illustrates the catch member 214 in greater detail.

Referring again to FIG. 13, optical scanner 210 may further be provided with a pair of recesses 220, 222 formed in the back face portion 216 thereof.

Having described the optical scanner 210 and the base assembly 300, an exemplary manner of selectively mounting the optical scanner 210 to the base assembly 300 will now be described. To attach the optical scanner 210 to the base assembly 300, the optical scanner 210 may first be positioned so that the optical scanner back face portion 216, FIG. 11, is facing the upper surface 322 of the base assembly support member 320 and the optical scanner catch members 212, 214, FIG. 13 are adjacent the latch members 390, 400, respectively, of the base assembly connection member 380, FIGS. 7 and 8. Thereafter, the optical scanner 210 may be moved toward the support member 320 causing the optical scanner catch members 212, 214 to force apart the latch member lips (the lip 397 of the latch member 390, for example, will move in the direction 398, FIG. 12). After the catch members clear the latch member lips, the lips will return to their original position to retain the optical scanner 210 within the connection member 380. Installed in this manner, the projections 410, 412 of the connection member 380, FIG. 8, will also be engaged within the optical scanner recesses 220, 222, respectively, FIG. 13, thus further restraining the optical scanner 210 from movement relative to the connection member 380.

To disengage the optical scanner 210 from the base assembly 300, the finger or thumb engageable portions of the latch members 390, 400 (e.g., the portion 394 of the latch member 390, FIG. 12) may be depressed, causing the latch members 390, 400 to release the optical scanner catch members 212, 214.

Figure 15:
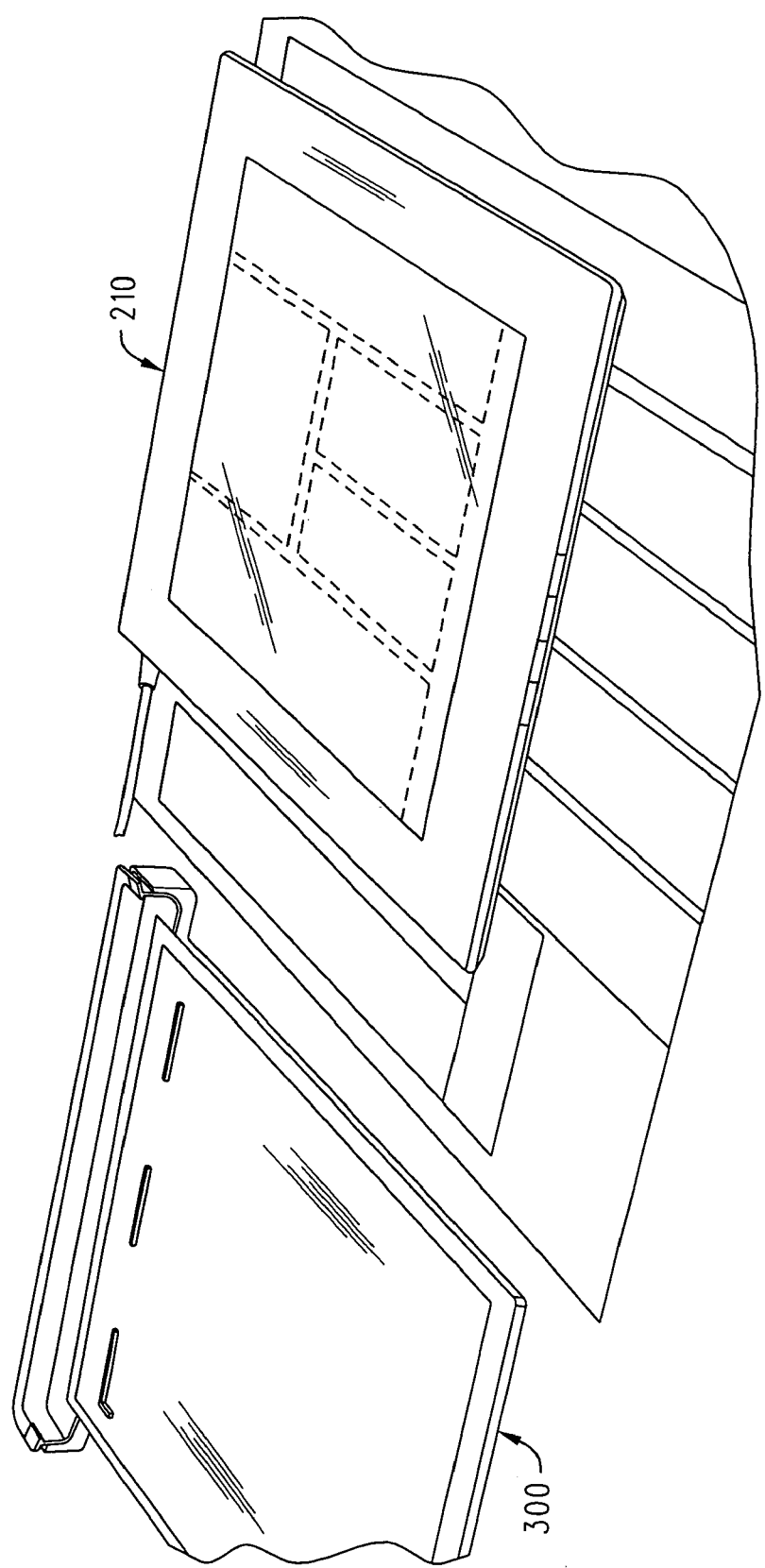
FIG. 15 is a top perspective view of the exemplary base portion of FIG. 7 and the exemplary optical scanner of FIG. 13.

In the manner described above, the optical scanner 210 may be easily attached to the base assembly 300 when it is desired to operate the scanner as a flatbed scanner as illustrated, for example, in FIG. 6. The optical scanner 210 may also, however, readily be removed from the base assembly 300 when it is desired to use the scanner in a freehand manner, as generally illustrated in FIG. 15.

Referring to FIG. 7, when the scanning assembly is operated in a flatbed mode, the guide members 330, 332, 334, provide a locating mechanism for locating an object to be scanned, e.g., a paper document, on the pad 328. The see-through design of the optical scanner 210 facilitates locating such a document by allowing a user to visually verify that the document is properly located and oriented even when the scanning assembly is in the closed position as illustrated, for example, in FIG. 5.

Because the guide members 330, 332, 334 are spring-loaded, as previously described, they may serve to locate a document on the pad 328, as described above, but will also retract due to contact with the optical scanner 210 as it is moved to the closed position. In this manner, the guide members 330, 332, 334 will not interfere with movement of the scanning assembly 200 to the closed position.

The scanning assembly 200 is also capable of scanning relatively thicker objects, such as books. Referring to FIG. 11, it can be appreciated that the ability of the connection member pins, e.g., the pin 382, to move in the directions 350 will allow the scanning assembly 200 to accommodate objects of varying thicknesses.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A scanning assembly comprising:
   a base;
   an optical scanner that is moveably attached to said base and pivotable relative to said base about an axis of rotation, wherein, said axis of rotation is moveable relative to said base in a direction transverse to said axis of rotation;

a hinge portion moveably attached to said base; and wherein, said optical scanner is attached to said hinge portion.

2. The scanning assembly of claim 1 and further comprising:

at least one pin formed on said hinge portion;

at least one slot formed in said base, said slot having a length and a width, said length being greater than said width;

wherein, at least a portion of said pin is located within said slot; and said pin is rotatable within said slot, thereby defining said axis of rotation.

3. The scanning assembly of claim 2 and further wherein:

said pin is moveable along said slot in said transverse direction.

4. The scanning assembly of claim 1 and further wherein said optical scanner is releaseably attached to said hinge portion.

5. The scanning assembly of claim 1, and further wherein said base comprises at least one guide member.

6. The scanning assembly of claim 5 and further wherein said guide member is moveable between:

an at least partially recessed position in which at least a portion of said guide member is recessed within said base; and an extended position in which said at least a portion of said guide member is not recessed within said base.

7. The scanning assembly of claim 6 and further wherein said guide member is biased toward said extended position.

8. A method of scanning comprising:

providing a scanning assembly comprising a base and an optical scanner moveably attached to said base, said scanning assembly being capable of assuming at least a closed condition in which said optical scanner is substantially parallel to said base and an open condition in which said optical scanner is not substantially parallel to said base;

placing an object to be scanned on said base while said scanning assembly is in said open condition;

moving said scanning assembly to said closed condition by pivoting said optical scanner relative to said base about an axis of rotation;

displacing said axis of rotation in a direction transverse to said axis of rotation while said scanning assembly is being moved to said closed condition; and scanning said object with said optical scanner after said moving said scanning assembly to said closed condition.

9. The method of claim 8, and further wherein:

said scanning assembly further comprises a hinge portion moveably attached to said base; and said optical scanner is attached to said hinge portion.

10. The method of claim 9, and further:

wherein said scanning assembly further comprises at least one pin formed on said hinge portion and at least one slot formed in said base, said slot having a length and a width, said length being greater than said width;

wherein at least a portion of said pin is located within said slot; and wherein said pivoting said optical scanner relative to said base about an axis of rotation comprises rotating said pin within said slot.

11. The method of claim 10 and further wherein said displacing said axis of rotation in a direction transverse to said axis of rotation comprises moving said pin along said slot in said transverse direction.

12. The method of claim 8 and further comprising:

removing said optical scanner from said base; and, thereafter using said optical scanner to scan a second object that is not located on said base.

13. The method of claim 8 and further wherein:

said base comprises at least one guide member; and said placing an object to be scanned on said base comprises locating said object to be scanned on said base by engaging said object with said guide member.

14. The method of claim 13 and further wherein said guide member is moveable between:

a recessed position in which at least a portion of said guide member is recessed within said base; and an extended position in which said at least a portion of said guide member is not recessed within said base.

15. A scanning assembly comprising:

a base;

an optical scanner moveably supported by said base;

said scanning assembly capable of assuming at least a closed condition in which said optical scanner is proximate said base and an open condition in which said optical scanner is not proximate said base; and wherein, said base comprises at least one guide member.

16. The scanning assembly of claim 15 and further wherein said optical scanner is hingedly attached to said base.

17. The scanning assembly of claim 15 and further wherein said guide member is moveable between:

an at least partially recessed position in which at least a portion of said guide member is recessed within said base; and an extended position in which said at least a portion of said guide member is not recessed within said base.

18. The scanning assembly of claim 17 and further wherein said guide member is biased toward said extended position.

19. The scanning assembly of claim 15 and further wherein:

said at least one guide member comprises a plurality of guide members; and said plurality of guide members are sized and located such that they serve to locate said object to be scanned on said base.

20. A method of scanning comprising:

providing a scanning assembly comprising a base and an optical scanner moveably supported by said base, said scanning assembly being capable of assuming at least a closed condition in which said optical scanner is substantially parallel to said base and an open condition in which said optical scanner is not substantially parallel to said base;

wherein, said base comprises at least one guide member;

locating an object to be scanned on said base while said scanning assembly is in said open condition by engaging said object with said guide member;

moving said scanning assembly to said closed condition; and scanning said object after said moving said scanning assembly to said closed condition.

21. The method of claim 20 wherein said optical scanner is hingedly attached to said base.

22. The method of claim 20 and further wherein said guide member is moveable between;
- an at least partially recessed position in which at least a portion of said guide member is recessed within said base; and
- an extended position in which said at least a portion of said guide member is not recessed within said base.

23. The method of claim 22 and further wherein said guide member is biased toward said extended position.

24. The method of claim 22 and further comprising:
- moving said guide member to said at least partially recessed position while moving said scanning assembly to said closed condition.

* * * * *

UNITED STATES PATENT AND TRADEMARK OFFICE
CERTIFICATE OF CORRECTION

| | | |
|---|---|---|
| PATENT NO. | : 7,104,450 B2 | Page 1 of 1 |
| APPLICATION NO. | : 10/820086 | |
| DATED | : September 12, 2006 | |
| INVENTOR(S) | : Modest Khovaylo | |

It is certified that error appears in the above-identified patent and that said Letters Patent is hereby corrected as shown below:

On the title page, item (73), in "Assignee", in column 1, line 2, after "Company," delete "LP.," and insert -- L.P., --, therefor.

In column 9, line 4, in Claim 22, after "between" delete ";" and insert -- : --, therefor.

Signed and Sealed this

Fifth Day of May, 2009

JOHN DOLL
*Acting Director of the United States Patent and Trademark Office*